United States Patent [19]
Wüstefeld

[11] Patent Number: 6,023,335
[45] Date of Patent: Feb. 8, 2000

[54] OPTOELECTRONIC SENSOR

[75] Inventor: Martin Wüstefeld, Sexau, Germany

[73] Assignee: Sick AG, Waldkirch, Germany

[21] Appl. No.: 09/069,343

[22] Filed: Apr. 29, 1998

[30] Foreign Application Priority Data

Apr. 30, 1997 [DE] Germany .......................... 197 18 390

[51] Int. Cl.$^7$ ............................. G01B 11/00; G01B 9/08
[52] U.S. Cl. ........................ 356/388; 356/390; 356/392
[58] Field of Search ................................ 356/3.09, 28, 1, 356/388, 390, 392

[56] References Cited

U.S. PATENT DOCUMENTS

| | | | |
|---|---|---|---|
| 5,504,569 | 4/1996 | Kato et al. | ................................ 356/28 |
| 5,629,704 | 5/1997 | Throngnumchai . | |

FOREIGN PATENT DOCUMENTS

| | | |
|---|---|---|
| 0520246A2 | 12/1992 | European Pat. Off. . |
| 0559357A1 | 9/1993 | European Pat. Off. . |
| 2526001 | 12/1976 | Germany . |
| 2816324 | 10/1979 | Germany . |
| 3213625C2 | 12/1985 | Germany . |
| 3532197A1 | 3/1987 | Germany . |
| 9301889 U | 5/1993 | Germany . |
| 4219260A1 | 12/1993 | Germany . |
| 4119797C2 | 2/1994 | Germany . |
| 4215272C2 | 11/1994 | Germany . |
| 4341080C1 | 2/1995 | Germany . |
| 4405376C1 | 2/1995 | Germany . |
| 4338978A1 | 5/1995 | Germany . |
| 4415944A1 | 11/1995 | Germany . |
| 19507812A1 | 9/1996 | Germany . |
| 19544632A1 | 6/1997 | Germany . |
| 19548578A1 | 7/1997 | Germany . |
| 2221294A | 1/1990 | United Kingdom . |
| WO 89/11710 | 11/1989 | WIPO . |

OTHER PUBLICATIONS

"Sehen und gesehen werden", in: *Konstruktionspraxis,* No. 2, Feb. 1996, 7. Jg. p. 88.

"Dreimal weiter, Neue ASI–Komponenten mit dreifacher Reichweite für die Prozessebene", in: *Flexible automation* Jan. 1996, p. 34.

GIT, Sicherheit & Management, Feb. 1995, p. 98.

*Primary Examiner*—Robert H. Kim
*Assistant Examiner*—Roy M. Punnoose
*Attorney, Agent, or Firm*—Townsend and Townsend and Crew LLP

[57] ABSTRACT

The invention relates to an optoelectronic sensor comprising a light transmitter for the transmission of light signals into a monitored region, and also a light receiver for the reception of light signals transmitted by the light transmitter, wherein an evaluation circuit which is directly or indirectly acted on by the light receiver is provided for the production of an article detection signal in the case when an object is present in the monitored region. The light receiver is formed as a spatially resolving receiver element for the determination of the position of the center of intensity of the received light in the region of the light sensitive area of the receiver element. A memory element which co-operates with the evaluation circuit is provided for the storage of at least desired position of the center of intensity of the received light. In addition, the evaluation circuit has means for the comparison of the actual positions found during the operation of the sensor with the stored desired position, whereby an article detection signal can be produced for the case in which the deviation of the actual position from the desired position exceeds a defined threshold value.

21 Claims, 2 Drawing Sheets

OPTOELECTRONIC SENSOR

FIELD OF THE INVENTION

The invention relates to an optoelectronic sensor comprising a light transmitter for the transmission of light signals into a monitored region, and also a light receiver for the reception of light signals transmitted by the light transmitter, wherein an evaluation circuit which is directly or indirectly acted on by the light receiver is provided for the production of an article detection signal in the case when an object is present in the monitored region.

DESCRIPTION OF PRIOR ART

Such sensors are, for example, used as simple light barriers or as multi-beam light grid systems for access monitoring, with the intention being in particular to secure dangerous working areas of machines or specific rooms within a building.

An article detection signal is generated in sensors of the named kind when an object enters into the monitored region and thus interrupts the light path between the light transmitter and the light receiver. The article detection signal can, for example, lead to the switching off of a machine or to the triggering of an acoustic or optical warning process.

In known systems the decision as to whether the light path between the transmitter and receiver is interrupted or not is based, as a rule, on a purely energetic consideration, which means that a conclusion is drawn regarding the interruption of the light path, and thus the presence of an object in the monitored region whenever the quantity of light received falls short of a specified value.

A problem in the known systems is the fact that, in certain applications, reflecting objects which are fundamentally permissible can be arranged within the angle of transmission of the light transmitter or within the field of view of the light receiver, i.e. are not intended to trigger an article detection signal, but can lead to reflection around an impermissible object in the monitored region. With such reflection around an impermissible object, the central light beam between the light transmitter and the light receiver can, for example, be interrupted by an impermissible object, but the said permissible reflecting objects can still direct so much light to the light receiver that the light received does not fall below the critical quantity of light. Consequently the generation of an article detection signal does not take place. In known sensors it can thus not be ensured that all impermissible objects present in the monitored region are reliably detected.

OBJECT OF THE INVENTION

An object of the invention consists in further developing an optoelectronic sensor of the initially named kind so that its reliability is increased, with the disturbing influence of permissible reflecting objects in the vicinity of the monitored region, or in the monitored region itself, being eliminated.

BRIEF DESCRIPTION OF THE INVENTION

In accordance with the invention this object is satisfied in that the light receiver is formed as a spatially resolving receiver element for the determination of the position of the center of intensity of the received light in the region of the light sensitive area of the receiver element, in that a memory element which co-operates with the evaluation circuit is provided for the storage of at least one desired position of the center of intensity of the received light, and in that the evaluation circuit has means for the comparison of the actual positions found during the operation of the sensor with the stored desired position, wherein an article detection signal can be produced for the case in which the deviation of the actual position from the desired position exceeds a defined threshold value.

In accordance with the invention it is thus no longer a simple photodiode which is used, as for example in the prior art, but rather a spatially resolving receiver element is used which has a light sensitive surface, with the spatially resolving receiver element being so designed that the position of the center of intensity of the received light on the light sensitive surface can be determined. A desired position is preset for the position of the center of intensity of the received light on the light sensitive surface of the receiver element and is compared during the operation of the sensor of the invention with the actual positions that are found. Through the introduction of an impermissible object into the monitored region the position of the center of intensity of the received light on the light sensitive surface is shifted. An article detection signal is generated when this shift of the actual position found in the operation of the sensor relative to the desired position exceeds a defined threshold value.

In accordance with the principle of the invention the recognition of an impermissible object present in the monitored region is thus also possible even when permissible reflecting objects are arranged in the vicinity of the monitored region, or in the monitored regions, in such a way that a considerable proportion of the quantify of light transmitted by the light transmitter is also conducted to the light receiver on interruption of the central light beam by an impermissible object, i.e. when the permissible objects lead to reflection around the impermissible object. The reliability of the sensor of the invention is thus significantly improved with respect to the sensors known from the prior art.

Furthermore, an advantage of the sensor of the invention consists in the fact that a more flexible range of use is present, because sensors in accordance with the invention can be installed very close to permissible reflecting objects, without these reflecting objects having a negative effect on the reliability of the sensor.

Furthermore, it is of advantage that in the production of a sensor in accordance with the invention no very precise adjustment of the individual optical components relative to one another is necessary and that cost-favorable optomechanical components can be used because, for each sensor that is produced, a desired value is respectively found after the conclusion of the production process which then automatically takes account of all the inaccuracies which have occurred during production. In this respect it should be remarked, by way of explanation, that inaccuracies which arise during production merely lead to the desired position of the center of intensity of the received light on the light sensitive surface being shifted relative to an ideally installed sensor. This does not, however, have any negative effects, since the shifted desired position can be stored at the actual desired position, which then—as already mentioned—automatically takes account of all inaccuracies.

It is preferred when the spatially resolving receiver element consists of a row arrangement of a plurality of light sensitive elements. In just the same way it is, however, also possible to provide a plurality of light sensitive elements in a matrix arrangement, with this matrix then forming the light sensitive surface of the full receiving element. When using a row arrangement, i.e. a uni-dimensional receiver element, those reflections around objects which take place in a plane which extends at least substantially parallel to the row arrangement of the light sensitive elements forming the receiver element can be detected or eliminated.

The use of CCDs offers itself as a solution when using a matrix arrangement of photosensitive elements.

The individual light sensitive elements of a row or matrix arrangement can, for example, be formed as photodiodes or as other elements suitable for the detection of light signals.

In particular, it is, however, also possible to form the spatially resolving receiver element provided in accordance with the invention as a one or two dimensional PSD, i.e. as a position sensitive detector. A position sensitive detector is an electro-optical element with a light sensitive surface, with the detector, for example, delivering two currents from the amplitude ratio of which conclusions can be drawn regarding the position, related to one dimension, of a light bead on the light sensitive surface of the PSD. If a PSD which delivers four currents is used, then conclusions can be drawn from the amplitude ratios of these currents relative to one another regarding the position in two dimensions of a light bead on the light sensitive surface of the PSD.

It is particularly advantageous when a desired position of the center of intensity of the received light can be found and stored by means of a teach-in method. In this case the sensor of the invention can be individually adapted to the conditions which are present at the respective place of use. In carrying out the teach-in method at the place of use, the position of the received light bead is already influenced by existing, permissible, reflecting objects. Consequently, when the desired position which is to be stored is found in the context of the teach-in method, in such a manner that a light signal is transmitted into the monitored region free of impermissible objects and is received again, then the position of the light bead brought about by this light signal on the light sensitive surface specifies the desired value which is matched to the individual circumstances. By means of the said teach-in method, the end user of the sensor of the invention is thus placed in a position of being able to effect an individual adaptation to the respective conditions of use, without these conditions of use having had to be previously taken into account in the manufacturing process of the sensor. This enables the most diverse possibilities of use of the sensor formed in accordance with the invention.

The spatially resolving receiver element of the sensor can be arranged in the region of the focal point of an image forming optical system. As a result of the capability of learning of the sensor given by the said teach-in method it is here in particular not necessary to pay precise attention to the maintenance of the exact position of the receiver element in the focal point. It is entirely conceivable that the spatially resolving receiver element is also arranged intrafocally or extrafocally with respect to the image forming optical receiver system.

The light transmitter and light receiver can be arranged at opposite sides of the monitored region. Alternatively, it is possible to provide the light transmitter and light receiver on the same side of the monitored region and a retroreflector on the opposite side of the monitored region. The last named variant corresponds to an auto-collimation arrangement.

The sensor of the invention can also be used in the context of a light grid arrangement. Here, a plurality of light transmitters and light receivers are arranged in each case alongside one another and can be arranged in the respectively required structure.

The light receivers of the light grid arrangement are preferably formed as one-dimensional receiver elements. These one-dimensional receiver elements can be rotated relative to one another, with the axis of rotation corresponding to that axis which connects mutually associated light transmitters or light receivers with one another. In this respect it is advantageous when the angle of rotation between adjacent receiver elements amounts to 90° C. In this manner a light grid arrangement in accordance with the invention is able to detect or eliminate any form of reflection around objects which take place in any desired plane which extends parallel to the said axis of rotation. Although only one-dimensional receiver elements are used, any desired types of reflection around objects can be eliminated as a result of the described rotation.

In a method for the operation of a sensor in accordance with the invention one or more desired positions which are to be stored can be found—as already mentioned—in that the sensor is operated at the place of use under operating conditions with an object-free monitored region. The monitored region can in this respect indeed have permissible reflecting objects, however, no impermissible objects at all may be present during the determination of the desired position. When different conditions of use are possible at a location of use, then a desired value can be found and stored for each of these conditions of use, with the different desired positions then, for example, being activatable by means of a selection switch. As an alternative, it is also possible to simultaneously activate all stored desired positions so that an article detection signal is only transmitted when the actual position differs by a respectively predetermined degree from all the desired positions that have been found.

The actual desired positions can be found and processed in the form of values representing one dimension or in the form of coordinate values representing two dimensions. When using a receiver element (PSD) delivering at least two partial currents, in which the partial currents characterize the position of the center of intensity of the received light, one can process the quotient of one partial current and the current sum of the partial currents as the parameter which characterizes the position which is found. In this manner, permissible reflections can be well distinguished from impermissible reflections. This is not the case with the normal PSD calculation algorithms in which, as a rule, the quotient is formed between the difference of two partial currents and their current sum.

Furthermore, it is advantageous when, in a method of operating a system in accordance with the invention with a plurality of light transmitters and light receivers in a light grid arrangement, a uniform shift of the centers of gravity of the received light all light receivers is classified as permissible mal-alignment of the system, or as permissible low frequency vibration, so that in these cases no transmission of an article detection signal takes place. In this manner a higher system availability is ensured, i.e. a lower susceptibility of the system to disturbance.

It is preferred when the presence of the spatially resolving receiver element is additionally exploited in order to compensate for unavoidable optomechanical system tolerances in light grids. Such system tolerances are, for example, brought about by the torsion of the mounting sections used for the light grids, by wedge errors in lenses, by non-centered positions of apertures, etc. In order to bring about the said compensation the desired position is separately determined for each spatially resolving receiver element in the context of the calibration procedure and is, for example, stored together with an associated permissible shift tolerance. In this way a situation can be achieved in which the light grid system of the invention satisfies the demands with respect to the angle of pivoting which exists in accordance with the safety norm, and simultaneously permits a maximum range of adjustment for the final user.

Finally, it is advantageous in a method for the operation of a sensor in accordance with the invention when an article detection signal is always transmitted when either the deviation of the actual position which has been found from the stored desired position exceeds the defined threshold value, or when the quantity of light received by the light receiver falls short of the defined minimum value. On occurrence of the extreme case in which the light receiver, for example, receives no light, or very little light, and consequently no actual position of the light bead can be detected, it is thus also possible to generate an article detection signal, since in this case the quantity of light received by the light receiver falls short of the defined minimum value.

DESCRIPTION OF PREFERRED EXEMPLARY EMBODIMENTS

Figure 1:
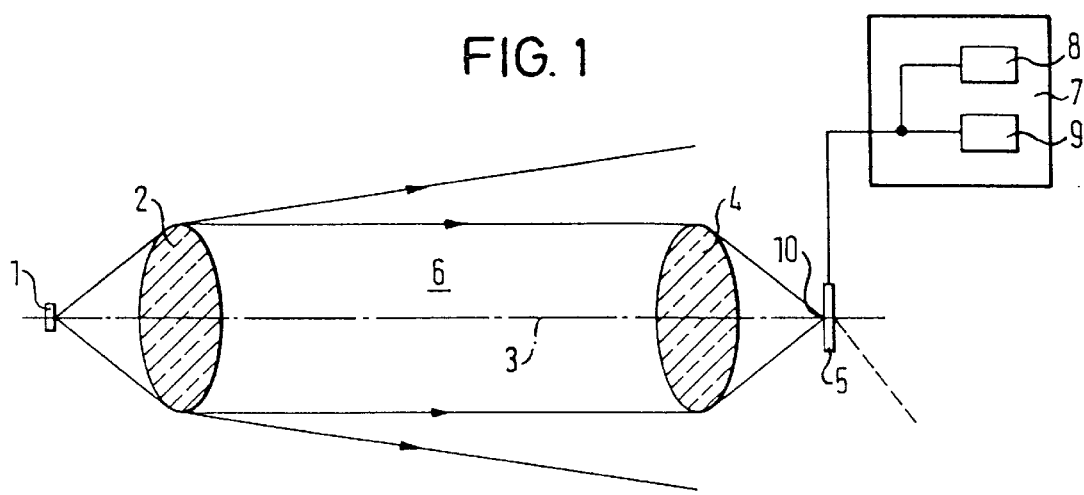
FIG. 1 is an illustration of the principle of a transmitter arrangement in accordance with the invention without reflecting objects in the monitored region or in the vicinity of the monitored region.

FIG. 1 shows a light transmitter 1 formed as an LED which transmits a cone of light in the direction of an optical transmission system 2. The optical axis 3 of the optical transmission system 2 coincides with the optical axis of an optical receiving system 4 and a light receiver 5 formed as a PSD is provided at the side of the optical receiving system remote from the optical transmitting system 2.

The monitored region 6 is present between the optical transmission system 2 and the optical receiver system 4.

The spatially resolving light receiver 5 delivers a signal dependent on the position of the light bead incident on it to an evaluation circuit 7 which is equipped with a memory element 8 for the storage of a desired position and also with a means 9 for the comparison of the desired position with the actual position that is found.

The optical transmission system 2 bundles the light transmitted from the light transmitter in such a way that a large part of this light is directed parallel to the optical axis 3 onto the optical receiving system 4. A part of the light transmitted by the light transmitter 1 is, however, radiated obliquely to the optical axis 3 and thus does not pass onto the optical receiver system 4. This circumstance is evident from the arrows drawn in FIG. 1 which illustrate the described light paths.

In the operating position of the sensor shown in FIG. 1, neither permissible nor impermissible reflecting objects are present in the monitored region 6 or in the vicinity of the monitored region 6 so that the light transmitted by the light transmitter 1 reaches the light receiver 5 uninfluenced by such objects. The light bead produced on the light receiver 5 is thus located in accordance with FIG. 1 in its zero position which is illustrated with the reference numeral 10. This zero position 10 is preferably located at the center of the light sensitive surface of the light receiver 5.

The operating state of FIG. 1 is thus suitable to find a desired position of the light bead formed on the light receiver 5, with this desired position corresponding to the zero position 10. This desired position can be stored in the memory element 8 of the evaluation circuit 7 so that it is available for a later comparison with actual positions.

Figure 2:
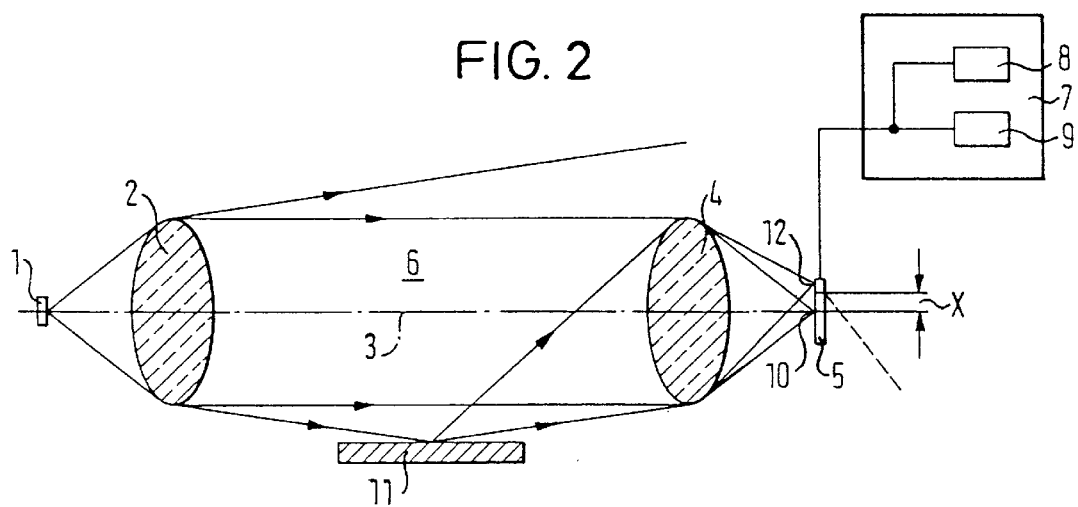
FIG. 2 is an illustration of the principle of a transmitter arrangement in accordance with the invention with a permissible reflecting object in the vicinity of the monitored region.

FIG. 2 shows the arrangement in accordance with FIG. 1 with a permissible reflecting object 11 additionally being present here beneath the monitored region 6. The reflecting surface of the reflecting object 11 extends parallel to the optical axis 3 and faces the monitored region 6.

The arrows shown in FIG. 2 illustrate that a part of the light transmitted by the light transmitter 1 strikes the reflecting surface of the permissible reflecting object 11 and passes from there to the optical receiving system 4. The optical receiving system 4 bundles the light reflected from the permissible reflecting object 11 in such a way that a second light bead arises on the light sensitive surface of the light receiver 5 at the position characterized by 12, which is spaced from the zero position 10.

The evaluation circuit 7 is able to calculate the center of the light intensity of the two light beads which are located at the zero position 10 and at the position 12. This calculation includes both the positions of the two light beads and also the quantities of light respectively received in the region of the two light beads. In this way a distance X is found for the distance of the center of the light intensity from the zero position 10. The spacing X is smaller than the spacing of the position 12 from the zero position 10.

The spacing X thus characterizes a desired position of the sum of the received light beads under the operating conditions in accordance with FIG. 2 with a permissible reflecting object 11 in the vicinity of the monitored region 6. It is possible for this desired value to be stored as a further desired value in addition to the desired value found in accordance with FIG. 1. In just the same way it is also possible for only the desired value found in accordance with FIG. 2 to be stored. When storing two desired values the generation of an article detection signal always takes place when the actual value that is found differs from the two desired values.

Figure 3:
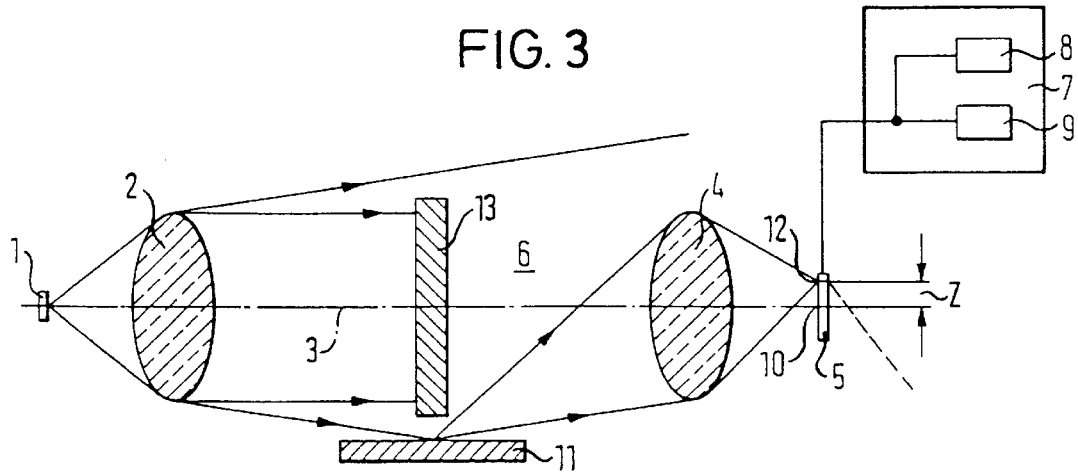
FIG. 3 is an illustration of the principle of a transmitter arrangement in accordance with the invention with a permissible object in the vicinity of the monitored region and also an impermissible object in the monitored region.

FIG. 3 shows the arrangement in accordance with FIG. 2 with the distinction that now an impermissible object 13, which is optically impermeable and which prevents light passing from the optical transmitting system 2 parallel to the optical axis 3 to the optical receiving system 4, is now present in the monitored region 6.

In accordance with FIG. 3 a part of the light transmitted from the light transmitter however still passes to the reflecting surface of the permissible object 11 from where this light component is deflected to the optical receiving system 4. In accordance with FIG. 2 the optical receiving system 4 bundles the light components received in this manner and thus causes the formation of a light bead at the position 12 on the light receiver 5. If now the evaluation circuit 7 again finds the center of the light intensity of the received light beads under the conditions in accordance with FIG. 3, then this position differs from the position found in accordance with FIG. 2, since, in accordance with FIG. 3, no light bead is received at the zero position 10 as a result of the impermissible object 13 that is present. The center of the light intensity found in accordance with FIG. 3 thus coincides with respect to its position with the position 12 which describes the location of that light bead which is produced by reflection at the permissible reflecting object 11. The center of the light intensity thus has a spacing Z from the zero position 10 in FIG. 3 which is different from the spacing X in accordance with FIG. 2.

If now the desired position stored in accordance with FIGS. 1 and 2 are compared with the actual position in accordance with FIG. 3, in the evaluation circuit 7 in the comparator means 9, then it can be determined that the deviation Z does not correspond to any desired value, so that a conclusion can be drawn as to the presence of an article or an impermissible object in the monitored region 6.

The impermissible object can thus be reliably recognized, despite the reflection around the impermissible object produced by the permissible object 11 which takes place in FIG. 3. A situation cannot arise, as in the prior art, in which the reflection at the object 11 leads to an adequate quantify of light being received and the transmission of an article detection signal being omitted simply as a result of this fact.

Figure 4:
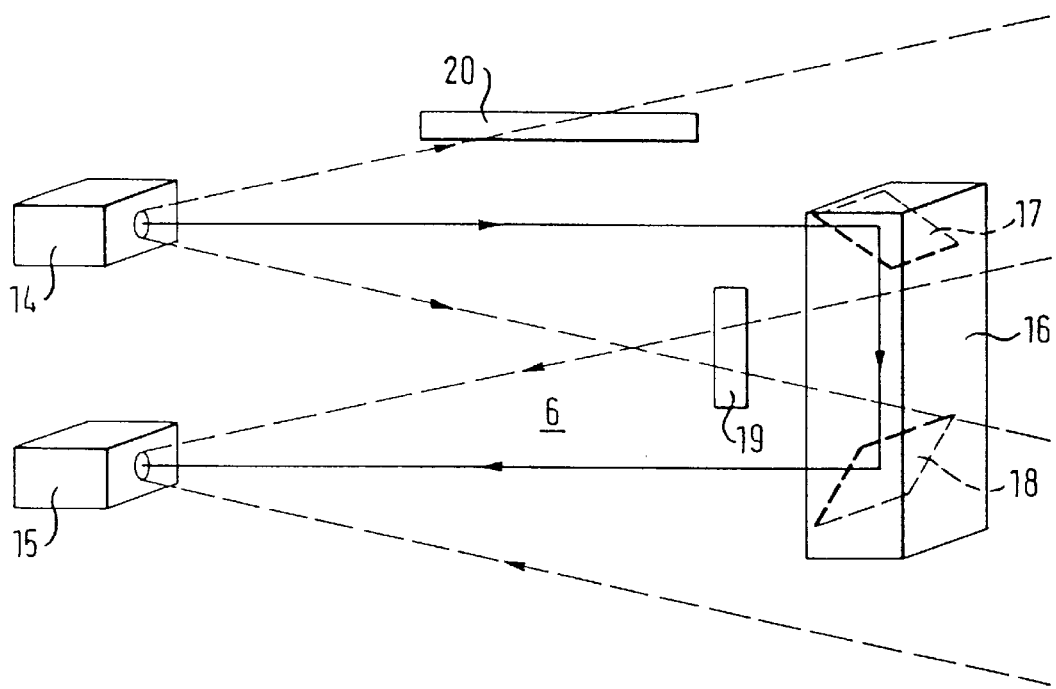
FIG. 4 is an illustration of the principle of a transmitter arrangement in accordance with the invention in an autocollimation arrangement with a permissible reflecting object in the monitored region and also a further permissible reflecting object in the monitored region.

FIG. 4 shows an optoelectronic sensor in accordance with the invention in an autocollimation arrangement. The light transmitter 14 and the light receiver 15 are arranged at one side of a monitored region 6 while a retroreflector 16 is provided at the opposite side of the monitored region 6 and has two mirrors 17, 18 which bring about a deflection of the light beam transmitted by the light transmitter 14 back to the light receiver 15. A triple mirror system can also be provided in place of the retro-reflector 16.

A permissible reflecting object 19 is arranged in the monitored region 6. Above the monitored region 6 there is arranged a further permissible reflecting object 20. Both reflecting objects 19, 20 bring about a shift of the center of the light intensity found by the light receiver 15, i.e. a shift of the center of intensity of the received light. The position of the center of intensity of the light found in accordance with FIG. 4 is stored as a desired value. When an impermissible reflecting or optically impermeable object is introduced into the monitored region 6 in the operation of the arrangement of FIG. 4 then this brings about a shift of the center of intensity of the light, which ultimately leads to the production of an article detection signal.

I claim:

1. An optoelectronic sensor comprising:
   a light transmitter for the transmission of light signals into a monitored region;
   a light receiver for the reception of light signals transmitted by the light transmitter, the light receiver including a plurality of individual light sensitive elements;
   an evaluation circuit that produces an article detection signal based on light signals received by the light receiver when an object is present in the monitored region, the evaluation circuit including means for a comparison of actual positions found during operation of the sensor with a stored desired position; and
   a memory element that cooperates with the evaluation circuit and stores at least one desired position of the center of intensity of received light;
   wherein the light receiver is formed as a spatially resolving receiver element for the determination of a position of a center of intensity of received light in a region of light sensitive area of the receiver element;
   wherein an actual position of the center of intensity of received light is calculated by the evaluation circuit from signals of the individual light sensitive elements;
   wherein the evaluation circuit compares the actual position of the center of intensity of received light with the at least one stored desired position; and
   wherein the article detection signal may be produced for the case in which deviation of the actual position from the at least one desired position exceeds a defined threshold value.

2. An optoelectronic sensor comprising:
   a light transmitter for the transmission of light signals into a monitored region;
   a light receiver for the reception of light signals transmitted by the light transmitter;
   an evaluation circuit that produces an article detection signal based on light signals received by the light receiver when an object is present in the monitored region, the evaluation circuit including means for a comparison of actual positions found during operation of the sensor with a stored desired position; and
   a memory element that cooperates with the evaluation circuit and stores at least one desired position of the center of intensity of received light;
   wherein the light receiver is formed as a spatially resolving receiver element for the determination of a position of a center of intensity of received light in a region of light sensitive area of the receiver element;
   wherein the evaluation circuit compares the actual position of the center of intensity of received light with the at least one stored desired position;
   wherein the article detection signal may be produced for the case in which deviation of the actual position from the at least one desired position exceeds a defined threshold value; and
   wherein the desired position of the center of intensity of the received light is found and stored by a teach-in method.

3. A method of operating an optoelectronic sensor, the method comprising:
   providing an optoelectronic sensor that comprises:
       a light transmitter for the transmission of light signals into a monitored region;
       a light receiver for the reception of light signals transmitted by the light transmitter, the light receiver including a plurality of individual light sensitive elements;
       an evaluation circuit that produces an article detection signal based on light signals received by the light receiver when an object is present in the monitored region, the evaluation circuit including means for a comparison of actual positions found during operation of the sensor with a stored desired position; and
       a memory element that cooperates with the evaluation circuit and stores at least one desired position of the center of intensity of received light;
       wherein the light receiver is formed as a spatially resolving receiver element for the determination of a position of a center of intensity of received light in a region of light sensitive area of the receiver element;
   transmitting light signals from the light transmitter into the monitored region;
   receiving the light signals transmitted by the light transmitter with the light receiver;
   determining an actual position of the center of intensity of received light in the region of light sensitive area of the receiver element, the actual position of the center of intensity of light being calculated by the evaluation circuit from signals of the individual light sensitive elements;

comparing the actual position of the center of intensity of received light with the at least one stored desired position; and producing an article detection signal for the case in which a deviation of the actual position from the at least one desired position exceeds a defined threshold value.

4. A method of operating an optoelectronic sensor, the method comprising:

providing an optoelectronic sensor that comprises:

a light transmitter for the transmission of light signals into a monitored region;

a light receiver for the reception of light signals transmitted by the light transmitter;

an evaluation circuit that produces an article detection signal based on light signals received by the light receiver when an object is present in the monitored region, the evaluation circuit including means for a comparison of actual positions found during operation of the sensor with a stored desired position; and a memory element that cooperates with the evaluation circuit and stores at least one desired position of the center of intensity of received light;

wherein the light receiver is formed as a spatially resolving receiver element for the determination of a position of a center of intensity of received light in a region of light sensitive area of the receiver element;

transmitting light signals from the light transmitter into the monitored region;

receiving the light signals transmitted by the light transmitter with the receiver;

determining at least one desired position of the center of intensity of received light for the purpose of individual adaptation;

comparing the actual position of the center of intensity of received light with the at least one desired position; and producing an article detection signal for the case in which a deviation of the actual position from the at least one desired position exceeds a defined threshold value.

5. An optoelectronic sensor in accordance with claim 1, wherein the spatially resolving receiver element comprises a row arrangement of a plurality of light sensitive elements.

6. An optoelectronic sensor in accordance with claim 1, wherein the spatially resolving receiver element comprises a matrix arrangement of a plurality of light sensitive elements.

7. An optoelectronic sensor in accordance with claim 1, wherein the light sensitive elements are formed as photodiodes.

8. An optoelectronic sensor in accordance with claim 2, wherein the spatially resolving receiver element is formed as a one or two dimensional PSD (position sensitive detector).

9. An optoelectronic sensor in accordance with claim 1, wherein a desired position of the center of intensity of the received light can be found and stored by means of the teach-in method.

10. An optoelectronic sensor in accordance with claim 2, wherein the spatially resolving receiver element is arranged in the region of the focal point of an image forming optical receiving system.

11. An optoelectronic sensor in accordance with claim 2, wherein the spatially resolving receiver element is arranged intrafocally or extrafocally with respect to an image forming optical receiving system.

12. An optoelectronic sensor in accordance with claim 2, wherein the light transmitter and the light receiver are arranged on opposite sides of the monitored region.

13. An optoelectronic sensor in accordance with claim 2, wherein the light transmitter and the light receiver are arranged on one side of the monitored region and a retroreflector is arranged on the opposite side of the monitored region.

14. An optoelectronic sensor in accordance with claim 2, wherein a plurality of light transmitters and light receivers are provided in a light grid arrangement.

15. An optoelectronic sensor in accordance with claim 14, wherein the light receivers of the light grid arrangement are formed as one-dimensional receiver elements which are respectively arranged rotated about the axis which connects the light transmitter and the light receiver to one another.

16. An optoelectronic sensor in accordance with claim 15, wherein the angle of rotation between the adjacent receiver elements amounts to 90°.

17. A method in accordance with claim 3 wherein a desired position which is to be stored is found and wherein the sensor is operated at a place of use under conditions of use with an object-free monitored region.

18. A method in accordance with claim 3 wherein actual and desired positions in the form of values representing one dimension or in the form of coordinate values representing two dimensions are found and processed.

19. A method in accordance with claim 4 wherein on using a receiver element (PSD) delivering at least two partial currents which characterize the position of the center of intensity of the received light, the quotient of one partial current and the current sum of the partial currents is processed as the parameter characterizing the position which is found.

20. A method in accordance with claim 4 wherein on using a plurality of light transmitters and light receivers in a light grid arrangement, a uniform shift of the centers of gravity of the received light of all light receivers is classified as permissible system mal-alignment or as permissible low frequency vibration and thus no article detection signal is triggered.

21. A method of operating an optoelectronic sensor in accordance with claim 4 wherein an article detection signal is transmitted when the deviation of the actual position that is found from the stored desired position exceeds the defined threshold or the quantity of light received by the light receiver falls short of a defined minimum value.

* * * * *